United States Patent
Wendt

(10) Patent No.: US 9,432,209 B2
(45) Date of Patent: Aug. 30, 2016

(54) SYSTEM AND METHOD FOR CONTROLLING THE ACCESS TO A NETWORKED CONTROL SYSTEM

(75) Inventor: Matthias Wendt, Wurselen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 227 days.

(21) Appl. No.: 13/148,684

(22) PCT Filed: Feb. 3, 2010

(86) PCT No.: PCT/IB2010/050496
§ 371 (c)(1),
(2), (4) Date: Nov. 14, 2011

(87) PCT Pub. No.: WO2010/092510
PCT Pub. Date: Aug. 19, 2010

(65) Prior Publication Data
US 2012/0062360 A1    Mar. 15, 2012

(30) Foreign Application Priority Data
Feb. 10, 2009   (EP) ..................................... 09152475

(51) Int. Cl.
*H04L 12/28* (2006.01)
*H04W 8/00* (2009.01)
(Continued)

(52) U.S. Cl.
CPC ........... *H04L 12/282* (2013.01); *H04L 12/281* (2013.01); *H04L 12/2809* (2013.01);
(Continued)

(58) Field of Classification Search
CPC ....... H04L 12/24; H04L 12/66; H04L 41/00; H04L 63/10; H04L 12/281–12/282; H04L 12/2809; H04W 84/12; H04W 8/005; G08C 17/02

USPC .......... 340/5.1–5.2, 5.8, 5.81–5.86; 370/338; 709/220, 223–227, 229–230; 711/150; 713/155–159

See application file for complete search history.

(56) References Cited

U.S. PATENT DOCUMENTS 7,508,801 B1 *  3/2009  Calhoun et al. .............. 370/338
2003/0158956 A1 *  8/2003  Tanaka et al. ................ 709/230
(Continued)

FOREIGN PATENT DOCUMENTS

EP          1507361 A2   2/2005
WO        03007588 A2   1/2003
(Continued)

*Primary Examiner* — Hai Phan
*Assistant Examiner* — Orlando Bousono
(74) *Attorney, Agent, or Firm* — Meenakshy Chakravorty

(57) ABSTRACT

A system and method for controlling access to a networked control system, such as a lighting control system or a home control system, include devices connected to the same network and assigned to a particular delimited space, a transmitter device which transmits access information for the devices within the delimited space over a range restricted transmission channel differing from the transmission channel(s) of the networked control system which substantially limits the reception of the access information to the delimited space, wherein the access information includes an access identifier for obtaining access for controlling one or more of the devices in the delimited space, and a receiver device which receives the transmitted access information and controls a device assigned to the delimited space over the network by using the access identifier contained in the received access information.

11 Claims, 2 Drawing Sheets

(51) Int. Cl.
*H04L 29/06* (2006.01)
*H04L 12/66* (2006.01)

(52) U.S. Cl.
CPC .............. *H04L63/10* (2013.01); *H04W 8/005* (2013.01); *H04L 12/66* (2013.01); *H04L 2012/285* (2013.01); *H04L 2012/2841* (2013.01)

(56) References Cited

U.S. PATENT DOCUMENTS

| | | | |
|---|---|---|---|
| 2004/0015262 A1* | 1/2004 | Brown et al. | 700/207 |
| 2004/0120297 A1* | 6/2004 | McDonnell et al. | 370/338 |
| 2005/0094610 A1 | 5/2005 | de Clerq et al. | |
| 2005/0190768 A1 | 9/2005 | Cutler | |
| 2005/0243777 A1* | 11/2005 | Fong | 370/338 |
| 2005/0254475 A1* | 11/2005 | Kubler et al. | 370/338 |
| 2006/0085579 A1 | 4/2006 | Sato | |
| 2006/0159268 A1 | 7/2006 | Jung et al. | |
| 2006/0294250 A1* | 12/2006 | Stone et al. | 709/229 |
| 2007/0198671 A1* | 8/2007 | Motoyama | 709/222 |
| 2008/0091285 A1* | 4/2008 | Smith | 700/90 |
| 2008/0095128 A1* | 4/2008 | Fong | 370/338 |
| 2008/0155094 A1* | 6/2008 | Roese et al. | 709/224 |
| 2008/0198818 A1* | 8/2008 | Montemurro et al. | 370/338 |
| 2008/0225883 A1* | 9/2008 | Tanaka et al. | 370/463 |
| 2008/0285530 A1* | 11/2008 | Dietrich et al. | 370/338 |
| 2009/0138612 A1* | 5/2009 | Grinder | 709/230 |
| 2009/0313358 A1* | 12/2009 | Shepherd et al. | 709/221 |

FOREIGN PATENT DOCUMENTS

| | | | |
|---|---|---|---|
| WO | WO-03/007588 | * | 1/2003 |
| WO | 2007095740 A1 | | 8/2007 |

* cited by examiner

SYSTEM AND METHOD FOR CONTROLLING THE ACCESS TO A NETWORKED CONTROL SYSTEM

FIELD OF THE INVENTION

The invention relates to controlling the access to a networked control system such as a lighting control system or a home control system.

BACKGROUND OF THE INVENTION

Networked control systems are a ubiquitous trend in commercial, industrial and institutional business markets and also in consumer markets. Examples of networked control systems are building automation systems, e.g. for lighting, heating and ventilation or safety. A networked control system may consist of devices like light ballasts, switches, daylight or occupancy sensors, actuators or meters. A networked control system also comprises a home control system for controlling for example media devices, which are connected to a network in the home and may be accessed and controlled via for example a web interface by means of another device such as a computer or network remote controller. The devices are preferably connected wirelessly, i.e. via RF (radio frequency) modules.

An example of a networked control system is the Light Master Modular (LMM) product line of the Applicant. LMM allows controlling of lamps in one or multiple rooms. A special version of LMM is controllable over a TCP/IP network connection remotely. In order to enable a comfortable control, a room controller with its IP-address must be bound to user interface devices being in the same room. However, one problem is that the user interface device has to get notified, when ever the room controller gets a new IP address, e.g. by means of a DHCP service, or a name server has to translate the controller name into the correct IP address. Another problem is that the user interface device may be moved to a different room but still controls devices in the original room, because the user interface device is still bound to the room controller of the original room.

US2005/0190768A1 addresses these problems and suggests to transmit the network address assigned to a device located in a delimited space to another discovering device not via the common network of the devices in the space, but in a manner that substantially limits its reception to the delimited space, for example by using infrared (IR) signals. When the discovering device receives such a signal containing the address of the discoverable device in the delimited space, it can establish a communication via the common network with the discoverable device that transmitted the address. Thus, discovery is limited to discovering devices residing in the delimited space also containing the discoverable devices.

SUMMARY OF THE INVENTION

It is an object of the invention to provide a system and a method, which implement a control mechanism for the access to a networked control system, such as the access to devices controlled by a room controller.

The object is solved by the subject matter of the independent claims. Further embodiments are shown by the dependent claims.

A basic idea of the invention is to control the access to devices of a networked control system such as a lighting system by transmitting access information for the devices within a delimited space over a transmission channel differing from the transmission channel(s) of the networked control system and in a manner that substantially limits the reception of the access information to the delimited space, so that a user control device may receive the access information essentially only in the delimited space and may thus control only the devices in the delimited space, when it is located in the delimited space. According to the invention, the access information comprises an access identifier for obtaining access for controlling one or more of the devices in the delimited space. According to an embodiment of the invention, the access information may further comprise user profiles of the devices, which inform a user of the functionality of devices and may implement user interfaces for the devices in a receiving user control device. In contrast to a kind of pairing mechanism for two devices to communicate as disclosed in US2005/0190768A1, the invention provides an access mechanism to a group of devices, namely devices in a delimited space such as room, which enables a user control device to access all devices in the delimited space by using the access identifier contained in the access information.

An embodiment of the invention provides a system for controlling the access to a networked control system, wherein
devices of the networked control system are connected to the same network and are assigned to the same delimited space,
a transmitter device transmits access information for the devices within the delimited space over a transmission channel differing from the transmission channel(s) of the networked control system and in a manner that substantially limits the reception of the access information to the delimited space, wherein the access information comprises an access identifier for obtaining access for controlling one or more of the devices in the delimited space, and
a receiver device receives the transmitted access information and controls a device assigned to the delimited space over the network by using the access identifier contained in the received access information.

The access information enables a receiver device in the delimited space to access all devices of the networked control system in the delimited space. The access identifier may be regarded as a kind login information, which allows the receiver device to get an access to all devices in the delimited space. It should be noted that the access information is not a simple network address of one of the devices in the delimited space, as it is known from US2005/0190768A1, but is information allowing a receiver device to access all devices in the delimited space. When a receiver device, for example a PDA of a user, is carried into another delimited space such as another room, the PDA may obtain the access information broadcasted in this room and obtain access to the devices located in this room. Devices as used herein comprise every device, which may be part of a networked control system and has a network connection, and may be accessed via a network. Devices may be for example lamps, light ballasts, switches, daylight or occupancy sensors, actuators or meters, media devices such as consumer electronic goods like networked MP3 players, sat receivers, media disk player, which allow control over an web user frontend.

The transmitter device may frequently change the access identifier contained in the transmitted access information. Thus, operation of the devices is essentially restricted to a receiver device located in the delimited space. In other words, when a receiver device is brought outside the delimited space, it may loose access to the devices located in the delimited space, when the access identifier is changed. This allows avoiding for example a situation, where a user changes a room and has still access to the devices of the room, where the user were previously located.

The transmitted access information may further comprise a network address of a central controller of the network, so that a direct communication with the central controller and a receiver device over the same network is enabled. For example, in case of a TCP/IP network, a receiver device may directly contact an embedded web server of a central controller and get access to special features of the central controller or an overview of the devices, which are controlled by the central controller.

The access information may further comprise user profiles of the devices and the receiver device may control a device assigned to the delimited space over the network by using the corresponding user profile and the access identifier contained in the received access information. By transmitting user profiles of devices, which are located in a delimited space, together with an access identifier, a comfortable access control to only the device within the delimited space may be achieved. The user profiles of devices, which may be contained in the access information, may for example instruct a receiver device to adapt a GUI (Graphical User Interface) on the receiver device for a comfortable control of the device, to which the user profile is assigned, such as showing the functionality of the device and allowing to use the functionality from the receiver device.

A user profile of a device may contain one or more of the following: user interface properties; controllable parameters of the corresponding devices; a pointer to a download location for a user interface properties and/or applets; device settings for special situations. User interface properties may be for example comprise text boxes and buttons of a user interface for a certain device. The controllable parameters may for example comprise lighting intensity, color, saturation in case of a lamp as controllable device, or the temperature in case of an HVAC (Heating, Ventilation, Air Conditioning) controller, or selectable pictures in case of a digital picture frame or TV set, or a selection of display information in case of an electronic display, or typical printer parameters in case of a printer station.

One device may act as a proxy device for the other devices, and the access information comprises only the user profile of the proxy device. The one device may be for example a central controller, which is configured to control all devices connected to the central controller, for example a central lighting control module such as the before mentioned LCM of the Applicant. Thus, only one user interface must be transmitted and displayed on a receiver device, which may make the control of the devices connected to the proxy device easier and more comfortable for a user. Also, devices located in other delimited spaces or devices shared with multiple delimited spaces such as a HVAC devices shared with multiple rooms in building may be controlled via the proxy devices.

The devices may be selected from the group comprising lamps, window shutters, HVAC controllers, electronic displays, printer stations, beamer, teleconference devices, roll down projection walls. This group essentially comprises devices, which may be typically located in an office environment, such as a conference or meeting room. However, also some of the device may be also found in an home environment, such as lamps and window shutters, thus qualifying the invention also for home use.

The transmitter device may transmit the access information via optical and/or RF means, wherein the range of transmission is essentially constrained to the delimited space. Optical means may for example comprise Infrared (IR) transmitter, or lamps, which generate modulated light in order to transmit the access information. The RF (Radio Frequency) means may typically comprise Near Field Communication (NFC), ZigBee™ or Bluetooth™ technology. These technologies typically operate with low power and, thus, merely have a restricted range of receipt. Especially, these technologies may be operated adapted to the delimited space so that access information can essentially be received in the delimited space, but not in neighbored spaces. There may be however also interesting situations where overlapping space can be detected e.g. an area between two workplaces and the control may neither work for one or the other or depending on a preprogrammed policy for both.

A further embodiment of the invention relates to a transmitter device being adapted for application with a system of the invention and as described before and comprising the transmitter device. The transmitter device comprises an interface to a device of the network, which may be configured as central controller of the network, wherein the interface is adapted to receive access information for the devices controlled by the central controller and assigned to a delimited space. The transmitter device may be for example implemented as a IR or RF transmitter with a serial interface, which allows a connection with the central controller, and the controller may control the transmitter device over the interface to transmit access information. Also, the transmitter device may comprise a logic which may generate the access information based on information received from the central controller.

The invention relates in another embodiment to a receiver device being adapted for application with a system of the invention and as described before. The receiver device is configured to process access information received within a delimited space and to control a device assigned to the delimited space by using the access identifier contained in the received access information. Particularly, the receiver device may be configured to control a device assigned to the delimited space by using a user profile of the device, which is contained in the received access information. For example, the receiver device may be a kind of remote control with a display for displaying a Graphical User Interface with a received user profile, allowing a user to comfortably access devices in the delimited space. The receiver device may for example be implemented by a PDA, which executes software, which configures an IR or RF interface of the PDA to receive the access information, to process the received information and to enable a user by means of a GUI to comfortably operate and control devices in the delimited space. In order to accomplish this, the PDA may establish a connection to the networked control system over for example a mobile data connection such as a wireless network connection such as a mobile radio communication data connection. Also, the receiver device may be implemented by a PC and an IR or RF detector device, which contains all necessary software (or a boot loader for the software) to allow the PC to act as user interface for the room infrastructure.

A further embodiment of the invention relates to a method for controlling the access to a networked control system, wherein devices of the networked control system are connected to the same network and are assigned to the same delimited space and the method comprises the acts of transmitting access information for the devices within the delimited space over a transmission channel differing from the transmission channel(s) of the networked control system and in a manner that substantially limits the reception of the access information to the delimited space, wherein the access information comprises an access identifier for obtaining access for controlling one or more of the devices in the delimited space, and receiving the transmitted access information and controlling a device assigned to the delimited space over the network by using the access identifier contained in the received access information.

The method may comprise one or more of the following:

frequently changing the access identifier contained in the transmitted access information;

transmitting with the access information a network address of a central controller of the network;

the access information may further comprise user profiles of the devices and controlling a device assigned to the delimited space over the network by using the corresponding user profile and the access information;

integrating in a user profile of a device one or more of the following: user interface properties; controllable parameters of the corresponding devices; a pointer to a download location for a user interface properties and/or applets; device settings for special situations, such as for example limit values for an allowed setting may be transferred or a preferred setting that adjusts to a nice all day setting with one button action;

selecting one device, which acts as a proxy device for the other devices, and integrating in the access information only the user profile of the proxy device;

selecting the devices from the group comprising lamps, window shutters, HVAC controllers, electronic displays, printer stations, beamer, teleconference devices, roll down projection walls;

transmitting the access information via optical and/or RF means, wherein the range of transmission is restricted in that the reception of the access information is essentially limited to the delimited space.

According to a further embodiment of the invention, a record carrier storing a computer program according to the invention may be provided, for example a CD-ROM, a DVD, a memory card, a diskette, internet memory device or a similar data carrier suitable to store the computer program for optical or electronic access.

A further embodiment of the invention provides a computer programmed to perform a method according to the invention such as a PC (Personal Computer).

These and other aspects of the invention will be apparent from and elucidated with reference to the embodiments described hereinafter.

The invention will be described in more detail hereinafter with reference to exemplary embodiments. However, the invention is not limited to these exemplary embodiments.

DETAILED DESCRIPTION OF EMBODIMENTS

Figure 1:
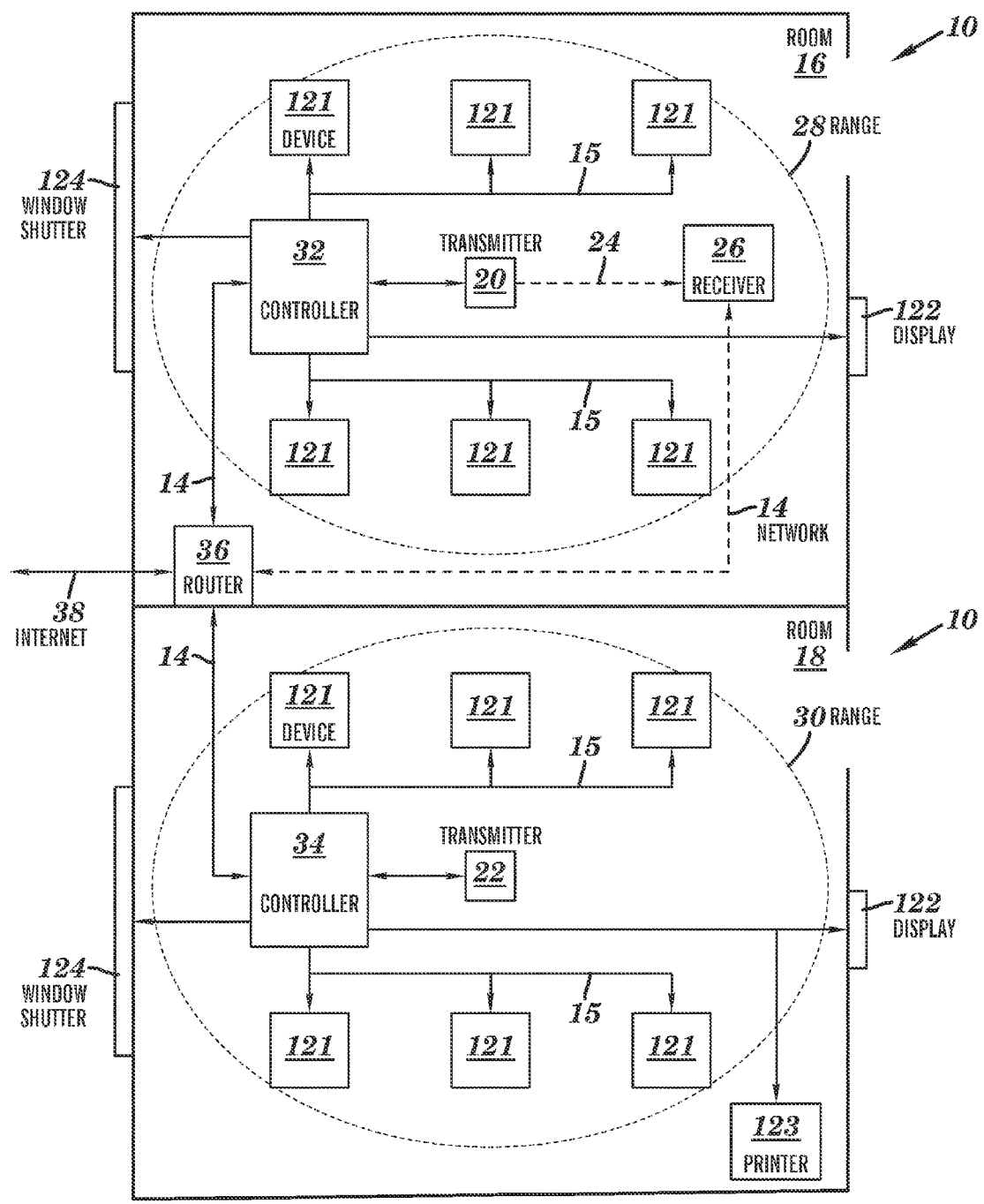
FIG. 1 shows an overview of a lighting system installation as an example of a networked control system with an access control according to the invention.

In the following, functionally similar or identical elements may have the same reference numerals.

The embodiments of this invention, which are described in the following, relate to a method to distribute access information for a user interface device or PC application by means of IR light through out a room as delimited space. This is achieved by adding an IR sender LED to a central light controller, as will be described in detail. The controller can select information to be broadcasted into the room that user interface devices can decode from IR and use to access functions for that room. Changing access codes will guarantee that if the user interface device gets moved out of the room will soon lose the access rights and can not erroneously operate devices in the old room. More over it will automatically learn available features of the area it is placed and will allow to control the light there. This is an enabling feature to allow mobile phones, palms or ultra portable-PCs and PCs to control room infrastructure via a wireless LAN (Local Area Network) or internet because users will only be granted access if they are in optical contact to the room controlled. This opens up also access to shutters, air condition, presentation or media playback means that are available for a room.

FIG. 1 shows an overview of two neighbored rooms 16 and 18. Both rooms are equipped with a networked control system 10, which comprises several lamps 121, an electronic display 122 installed near the entry to the room 16 or 18, respectively, a window shutter 124, and a central controller 32 and 34, respectively, to which the devices 121, 122 and 124 are connected via control connections 15. In room 18 also a printer station 123 is located, which is connected to the central controller 34 of this room. A central controller may be implemented based on the LCM of the Applicant, but with additional features such as a TCP/IP network connection and an interface for a transmitter device 20/22 (as will be explained later).

Each controller 32 and 34 is part of a networked control system of the building housing the two rooms 16 and 18. The controller 32 and 34 are connected to a TCP-IP network 14, which may enable an access for example to a WAN (Wide Area Network) such as the Internet 38 by means of a router 36. The central controller 32 and 34 may also be accessed from a remote location via the Internet 38 and the router 36. The router 36 comprises also a DHCP (Dynamic Host Configuration Protocol) server, which automatically assigns IP addresses to the controller 32 and 34 and to each device, which is connected to the TCP/IP network 14 and does not have a fixed IP address.

Each controller 32 and 34 is connected to an IR transmitter device 20 or 22, respectively, which is controlled by the connected controller 32 or 34, respectively, and frequently transmits in broadcast manner access information within the room 16 or 18, respectively. The receiving range 28 and 30, respectively, of the broadcasted access information is shown by a dotted circle around the IR transmitter device 20 and 22, respectively. Thus, the broadcasted access information can only be received in the respective room, and not in any neighbored room. It is clear that even without the wall between rooms 16 and 18 the non overlapping feature of ranges 28 and 30 would allow to control the two different lamp installations dependant on the position of the controller. This might be the important application in open plan office spaces or cube farms. Instead of using an IR transmitter device, also one or more of the lamps 121 can be controlled by the respective controller 32 or 34 to modulate their light flux with the access information. Thus, no extra transmitter device for the access information broadcasting is required. Alternatively or additionally, RF technologies can be applied to transmit access information. The applied RF technologies should be selected and operated such that the range 28 and 30, respectively, corresponds essentially to the respective room 16 and 18. Typically and suitable known RF technologies are the already before mentioned ZigBee™ and Bluetooth™ technologies. These RF technologies allow restricting the range of receipt to some meters, which may be sufficient to cover the area of a standard conference or meeting room. For larger facilities, several transmitter devices may be applied to cover the entire are of a facility.

Access to the devices 121-124, or to control of the devices 121-124 in each of the rooms 16 and 18 may be achieved by means of a receiver device 26, for example a PDA or a PC of a user. The receiver device 26 is adapted to receive the broadcasted access information within a room, for example comprises an IR receiver or a RF module. Also, the receiver device 26 may establish a network connection 14 for example a wireless network connection with the router 36 in order to access the Internet 38 and the central controller 32. Furthermore, the receiver device 26 is configured to process the received access information. The access information comprises user profiles of the devices 121-124 and a room identifier as an access identifier to the devices. The following table shows an example of typical access information for lamps in a room:

```
Room ID 01234567
device ID 01 user profile (lamp)
device ID 02 user profile (electronic display)
device ID 03 user profile (window shutter)
...
```

Each user profile comprises user interface properties; controllable parameters of the corresponding devices; a pointer to a download location for a user interface properties and/or applets; device settings for special situations. An example of a typical user profile "device ID XY user profile" of a lamp is shown in the following table:

```
UI Property "ON/OFF"
UI Property "Color"
UI Property "Brightness"
UI Property "Saturation"
http://www.xyz.com/UI/applets/UI_properties
Setting "Presentation"
Setting "Meeting"
Setting "Videoconference"
...
```

The receiver device 26 processes the received access information by means of a dedicated software executed by the receiver device, for example an networked control system access program, which may be for example executed by a PDA or PC. Each user profile contained in the received access information is processed in that a GUI on the receiver device 26 is configured in accordance with the received user profiles. Thus, a GUI is displayed with controls for each device 121-124 in the room for controlling each device, for example in case of a lamp for switching the lamp on or off, adjusting the color, brightness and saturation of the lighting created by the lamp. Also, an applet may be downloaded from the Internet 38 under the exemplary address http://www.xyz.com/UI/applets/UI_properties which implements the GUI for the respective device. The location of downloadable applets must not necessarily be the Internet, also an HTML frontend integrated in the controller 32 or 34, respectively, itself might get accessed in the same way by issuing a local IP address or by issuing a device name that can be localized by a dynamic name server. So the device ID XY user profile may also contain a pointer into a local area network space. Particularly, the applet may implement further functionality which is not achievable only with the program on the PDA or PC. For example, the GUI may display buttons "Presentation", "Meeting" and "Videoconference" for setting a lamp for the respective situation. When a user selects the button "Presentation" on the PDA, a command is transmitted from the PDA to the central controller 32 in the room 16 to set the lamps 121 to create a lighting suitable for doing presentations with a beamer in the room 16, such as a dimmed lighting and instructing the window shutter 124 to close the window. Also, the central controller 32 may roll down a projection screen. The command transmitted from the PDA contains the room identifier in order to assure that only devices in the room 16 are controlled, and no devices of the neighbored room 18.

Figure 2:
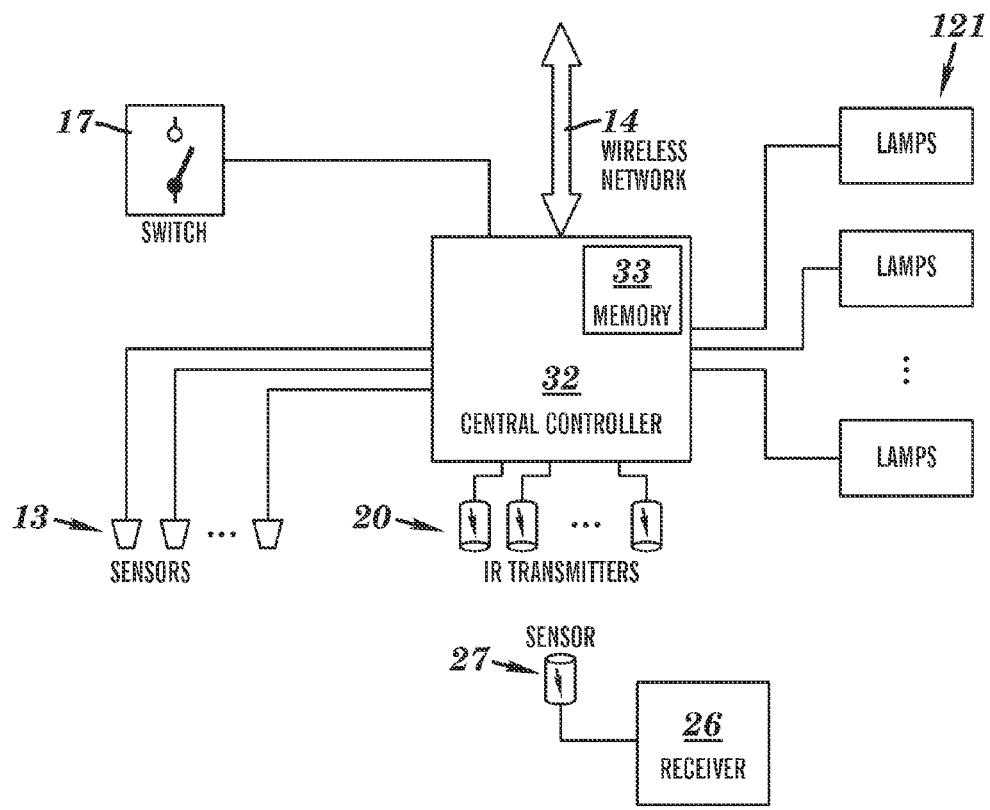
FIG. 2 shows a block diagram of an embodiment of a system for controlling the access to a networked lighting system according to the invention.

A block diagram of central controller for a lighting system is shown in FIG. 2. The central controller 32 controls a number of lamps 121 connected to the controller 20. Different sensors 13 may be connected to monitor the room, for example motion or presence detection and/or light flux sensors. Another example of a sensor is an air quality sensor, which may be able to set a warn signal on the remote receiver device 26 when CO2 concentration gets to high for a meeting situation. So sensors may not only be used that have direct control towards the lighting system but get used by human operators. Also user operated switches 17 may be connected. The controller 32 is remotely accessible over an addressable network connection like a TCP/IP wired or wireless network 14. The controller 32 is in addition connected to several IR transmitters 20. Especially, for a large room multiple IR transmitter 20 may be necessary to flood the whole room. The controller 20 has an access identifier that is stored in an internal memory 33. The access identifier may also correspond to the room identifier as mentioned above with regard to FIG. 1. During active time the controller 32 may constantly or from time to time broadcast access information containing the access identifier from the internal memory 33 and user profiles for the lamps and the controller itself via the IR transmitter 20 to a UI (User Interface) receiver device 26 that is equipped with an IR sensor 27 for receiving the IR signals sent out by the IR transmitter 20. The access information may also comprise the controller's address, for example IP address or the node name, and also other information supporting the light control which may be broadcasted into the room e.g.: what parameters are available, how the UI should look like etc.

In a further improved embodiment of the central controller a frequently, particularly constantly changing access identifier or code may be broadcasted so that only UI devices receiving it in the room may access devices in the room. Stolen UI devices will not work any more. Or UI devices that get moved to another room with the same kind of light controller installed will automatically take over the role of a user interface for the new room.

Optically broadcasted information may also pinpoint to an internet location or a local server or storage place where an appropriate user interface applet can be loaded enabling PCs or other programmable appliances to get appropriate UI visualization and controls, refer to the table above showing a typical user profile broadcasted with the access information in a room.

In a further improved embodiment the central controller may also have memory that can be used to store access information as well as user interface control information for totally different features as installed in the room like beamers, TV-sets, teleconference means, roll down projection walls, window shutters or air condition or heating control. In this way a user of a meeting room having an IR detector integrated in his laptop or plugged in the USB of the laptop gets automatic notification of all available features and a user interface applet to control these. This would be the end of lost remote controls for meeting rooms.

It is clear that a networking of the aforementioned features makes sense in many cases anyway, e.g. adjust lights and window shutters automatically when the beamer gets activated and roll down the projection screen, or having special light settings for TV viewing or teleconferences.

It may be even beneficial to integrate the access to the other room features through the light controller which then proxies the different control commands towards the different devices. In this way the UI has only to communicate with a single entity. This may be very advisable if devices like air-conditioning or heating are shared with multiple rooms, since then one light controller can decide for the setting of such a room-shared device. Also intelligent spaces where presence detection gets used to control some of the room features would be straighter forward in the implementation.

Figure 3:
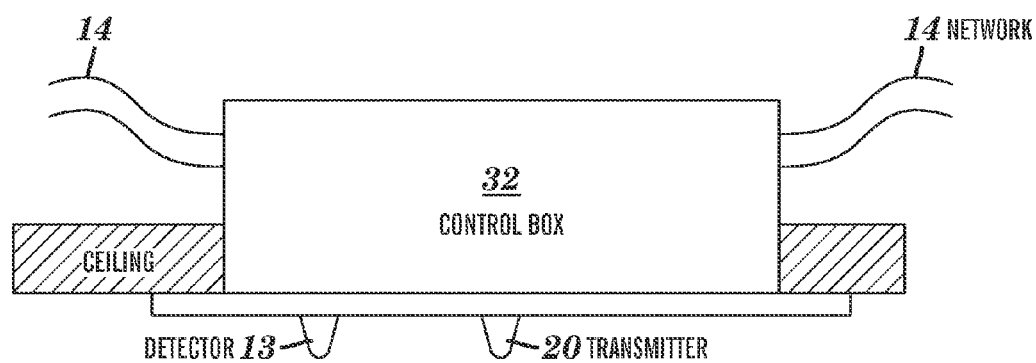
FIG. 3 shows an embodiment of a central controller of a system for controlling the access to a networked lighting system according to the invention.

One possible implementation of a central controller 32 is shown in FIG. 3. The control box 32 is mounted in a hole in the ceiling and has directly mounted an IR broadcasting transmitter 20 in the cover. Other sensors like presence detectors 13 may also be integrated directly in the box 32.

The invention can be applied in any networked control system such as a complex lighting system with a plurality of light sources, for example a lighting system installed in homes, shops and office applications. It is particularly suitable for the comfortable and easy control of functions by means of a user interface device.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A system for controlling the access to a networked control system having transmission channel(s), the system comprising:
    a first central controller located entirely within a first particular delimited space, wherein a plurality of devices within the first particular delimited space are connected to the same network via the first central controller, and further wherein the first central controller is configured to control the plurality of devices;
    a second central controller located entirely within a second particular delimited space, wherein a plurality of devices within the second particular delimited space are connected to the same network via the second central controller, and further wherein the second central controller is configured to control the plurality of devices;
    a router in communication with the first and second central controllers;
    a first transmitter device located within the first particular delimited space and in communication with the first central controller, wherein the first transmitter device is configured to transmit access information for access to the plurality of devices within the first particular delimited space over a range restricted transmission channel differing from the transmission channel(s) of the networked control system and in a manner that substantially limits the reception of the access information to the first particular delimited space, wherein the first transmitter device is further configured to change the access information transmitted within the first particular delimited space, and wherein the access information comprises a first access identifier for obtaining access for controlling one or more of the devices in the first particular delimited space;
    a second transmitter device located within the second particular delimited space and in communication with the second central controller, wherein the second transmitter device is configured to transmit access information for access to the plurality of devices within the second particular delimited space over a range restricted transmission channel differing from the transmission channel(s) of the networked control system and in a manner that substantially limits the reception of the access information to the second particular delimited space, wherein the second transmitter device is further configured to change the access information transmitted within the second particular delimited space, and wherein the access information comprises a second access identifier for obtaining access for controlling one or more of the devices in the second particular delimited space; and
    a portable receiver device configured to receive transmitted access information by direct access from the first transmitter device when the receiver device is located within the first particular delimited space or from the second transmitter device when the receiver device is located within the second particular delimited space, and further configured to access the first and second central controllers through wireless access to the router, and further configured to control at least one of the plurality of first devices assigned to the first particular delimited space using the first access identifier when the portable receiver device is located within the first particular delimited space, and further configured to control at least one of the plurality of second devices assigned to the second particular delimited space using the second access identifier when the portable receiver device is located within the second particular delimited space.

2. The system of claim 1, wherein the transmitted access information further comprises a network address of the respective central controller.

3. The system of claim 1, wherein one device acts as a proxy device for the other devices, and the transmitted access information includes the user profile of the proxy device.

4. The system of claim 1, wherein the devices are selected from the group consisting of: lamps, window shutters, HVAC controllers, electronic displays, printer stations, beamer, teleconference devices, and roll down projection walls.

5. The system of claim 1, wherein the respective transmitter device transmits the respective access information via optical and/or RF means, wherein the range of transmission is restricted in that the reception of the access information is essentially limited to the respective delimited space.

6. The system of claim 1, wherein the first or second access identifier comprises login information which allows the receiver device to get access to all devices in the respective delimited space.

7. The system of claim 1, wherein the transmitted access information further comprises user profiles of the devices and the portable receiver device controls a device assigned to the respective delimited space over the network by using the corresponding user profile and the respective access identifier contained in the received access information.

8. The system of claim 7, wherein a user profile of a device contains one or more of the following: user interface properties; controllable parameters of the corresponding devices; a pointer to a download location for a user interface properties and/or applets; device settings for special situations.

9. A method for controlling access to a networked control system having transmission channel(s), wherein a plurality of devices of the networked control system are connected to the same network, the method comprising the acts of:

transmitting, from a first transmitter device located within a first particular delimited space and in communication with a first central controller located entirely within the first particular delimited space, access information for access to the plurality of devices within the first particular delimited space over a transmission channel differing from the transmission channel(s) of the networked control system and in a manner that substantially limits the reception of the access information to the first particular delimited space, wherein the access information comprises first access identifier for obtaining access for controlling one or more of the plurality of devices in the first particular delimited space;

transmitting, from a second transmitter device located within a second particular delimited space and in communication with a second central controller located entirely within the second particular delimited space, access information for access to the plurality of devices within the second particular delimited space over a transmission channel differing from the transmission channel(s) of the networked control system and in a manner that substantially limits the reception of the access information to the second particular delimited space, wherein the access information comprises a second access identifier for obtaining access for controlling one or more of the plurality of devices in the second particular delimited space;

receiving transmitted access information by a portable receiver device via direct access with the first transmitter device when the portable receiver device is located within the first particular delimited space or via direct access with the second transmitter device when the portable receiver device is located within the second particular delimited space;

establishing, by the portable receiver device, a direct wireless connection with a router, wherein the router is in communication with the first central controller and the second central controller;

accessing, via the router, the network with the portable receiver device using the first or second access identifier contained in the received access information;

communicating, via the router, with the first central controller to control at least one of the plurality of devices within the first particular delimited space over the network access established through the direct wireless connection, when the portable receiver device is located within the first particular delimited space;

communicating, via the router, with the second central controller to control at least one of the plurality of devices within the second particular delimited space over the network access established through the direct wireless connection, when the portable receiver device is located within the second particular delimited space; and changing the access information transmitted.

10. The method of claim 9, comprising one or more of the following:

transmitting with the access information a network address of the first or second central controller of the network;

controlling a device assigned to the respective delimited space over the network using a corresponding user profile of the plurality of devices and the access information;

integrating within the user profile of at least one of the plurality of devices one or more of the following: user interface properties; controllable parameters of the corresponding devices; a pointer to a download location for a user interface properties and/or applets; device settings for special situations;

selecting one device, which acts as a proxy device for the other devices, and integrating in the access information only the user profile of the proxy device;

selecting the devices from the group consisting of lamps, window shutters, HVAC controllers, electronic displays, printer stations, beamer, teleconference devices, roll down projection walls;

transmitting the access information via optical and/or RF means, wherein the range of transmission is restricted in that the reception of the access information is essentially limited to the respective delimited space.

11. The method of claim 9, wherein the first or second access identifier comprises login information which allows access to all devices in the respective delimited space.

* * * * *